United States Patent [19]
Hara et al.

[11] 3,987,662
[45] Oct. 26, 1976

[54] FLUID LEAKAGE DETECTION APPARATUS

[75] Inventors: Atsushi Hara, Tokyo; Hideo Hayashi; Sigeru Ohtomo, both of Yokohama, all of Japan

[73] Assignee: Nippon Kokan Kabushiki Kaisha, Tokyo, Japan

[22] Filed: June 30, 1975

[21] Appl. No.: 591,319

[30] Foreign Application Priority Data

July 3, 1974 Japan................. 49-76183

[52] U.S. Cl.......................... 73/40.5 R; 235/151.34; 340/242
[51] Int. Cl.².......................................... G01M 3/28
[58] Field of Search.................. 73/40.5 R, 40, 196, 73/231 M; 235/151.34; 340/239 R, 242

[56] References Cited
UNITED STATES PATENTS

| 3,505,513 | 4/1970 | Fowler et al.......................... 73/40 X |
| 3,667,285 | 6/1972 | Wright et al....................... 73/40.5 R |
| 3,690,150 | 9/1972 | Mullen.............................. 73/40.5 R |
| 3,695,094 | 10/1972 | Hulme............................... 73/40.5 R |
| 3,702,074 | 11/1972 | Mullen.............................. 73/40.5 R |
| 3,711,689 | 1/1973 | Park................................ 73/40.5 R X |
| 3,723,987 | 3/1973 | Barone, Jr. et al................. 73/196 X |
| 3,807,220 | 4/1974 | Ottenstein et al................. 73/40.5 R |
| 3,851,521 | 12/1974 | Ottenstein........................ 73/40.5 R |
| 3,854,038 | 12/1974 | McKinley........................... 235/151.34 |

FOREIGN PATENTS OR APPLICATIONS 864,113   2/1971   Canada.................. 73/196

Primary Examiner—Donald E. Watkins
Assistant Examiner—Joseph W. Roskos
Attorney, Agent, or Firm—Flynn & Frishauf

[57] ABSTRACT

An apparatus detects a leakage position between the upstream and downstream points of a fluid passage, where the fluid leaks. The flow rate of the fluid is detected both at the upstream and downstream points repeatedly at intervals much shorter than a difference $\Delta\tau$ between time $\tau_1$ and time $\tau_2$ which elapse until a flow rate change appears respectively at the upstream and downstream points. Thus the pattern of the flow rate variation is detected with respect to the time $\tau_1$ and the time $\tau_2$, thereby obtaining the time difference $\Delta\tau$. Based on the time difference $\Delta\tau$, the distance $x$ between the upstream and downstream points is obtained, thus locating the fluid leakage position, by the following formula:

$$X = \frac{l + a \cdot \Delta\tau}{2}$$

where $l$ denotes the distance between the upstream and downstream points, and $a$ the speed of sound through the fluid.

6 Claims, 10 Drawing Figures

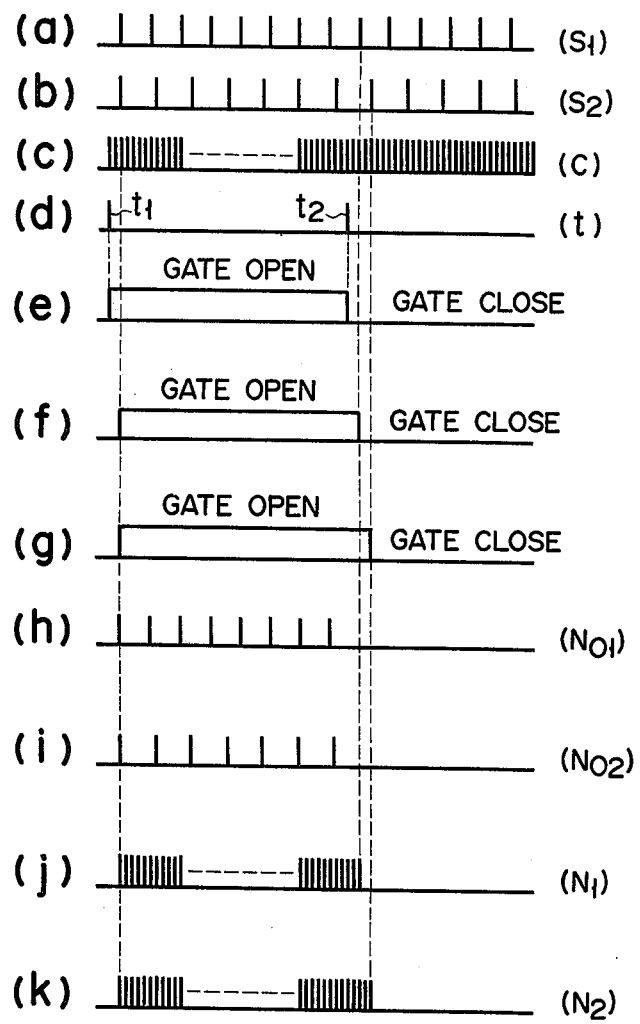

FLUID LEAKAGE DETECTION APPARATUS

BACKGROUND OF THE INVENTION

This invention relates to an apparatus for detecting quickly and accurately a fluid leakage occurring at a position between the upstream and downstream points of a relatively long fluid passage and the position of the fluid leakage as well.

Sometimes a fluid passage such as an oil pipe line may encounter a fluid leakage due to an accidental formation of a hole or a crack in the pipes. Such a fluid leakage possibly grows into a great disaster if the fluid has a low flash point as gasoline or is a very poisonous chemical substance. It is therefore necessary to maintain the pipe line in normal condition to guarantee a continuous transportation of the fluid, to detect a leakage as soon as possible if it should happen, and to locate accurately the position of leakage.

Hitherto known is such a leakage detection apparatus as illustrated in FIG. 1. Such a conventional apparatus is installed in an oil transportation system wherein between a tank 1 at the oil supply station and a tank 2 at the oil receipt station a pipe line 3 is connected so as to supply the oil from the tank 1 to the tank 2 with assistance of a pump 4 at the upstream. Near the pump 4, for example, a turbine flow meter 5 is attached to the pipe line 3 and works as primary flow meter. Similarly near the tank 2 another turbine flow meter 6 is attached to the pipe line 3 and functions as secondary flow meter. Each turbine flow meter comprises, as well known, a magnetic rotary blade to be rotated by the flowing fluid and an electromagnetic coil surrounding the rotary blade. These flow meters 5 and 6 generate pulse signals at pulse rate proportionate to the flow rate of the fluid passing through the pipe line 3.

Unless a fluid leakage takes place, the two turbines 5 and 6 generate pulse signals at the same pulse rate. These pulse signals are passed through gate circuits 8 and 9, the gates of which are simultaneously opened by the output of a gate signal generator 7. Then they are counted by a downcounter 10, and the difference in number between the pulse signals from the gate circuit 8 and those from the gate circuit 9 is detected to be zero in this case. Should the fluid leak from the pipe line 3, for instance, at a position nearer to the flow meter 5 than to the flow meter 6, the turbine flow meter 6 at the downstream generates fewer pulse signals for a given time. As a result, the difference in number of the pulse signals is sensed by the down-counter 10, the count value of which is then supplied to a comparator 11.

Even if the fluid does not leak at all, the pulse rate of each turbine flow meter varies temporarily due to, for example, changes in fluid pressure built up by the pump 4 or in accordance with the kind of the fluid. Due to such variation of pulse rate an erroneous detection of fluid leakage could be made. To avoid such an erroneous leakage detection a warning value is predetermined and compared with the count value of the down-counter 10. Namely, if the fluid leaks from the pipe line 3, the count value of the down-counter 10 surpasses the predetermined warning value, and the comparator 11 gives of a warning signal telling the occurrence of a fluid leakage.

Generally, if a counter counts pulses supplied through a gate circuit, its count value at the end of the predetermined opening period of the gate circuit turns out to be erroneous by ±one pulse inevitably because of quantization error. As a result, the erroneous count value of the counter reduces the resolution of the count value with respect to the actual flow rate of the fluid. To elevate the resolution of the count value it may be proposed that the count value of the counter be made larger so as to make the ±one-pulse counting error small in proportion to the count value. Further, the resolution of the count value is limited by the pulse rate of the flow meters. The number of pulse signals from the flow meters should therefore be increased so that more pulses might be counted by the counter in a given time, thus diminishing the proportion of the ±one-pulse counting error to the whole count value of the counter. However, the pulse rate of a commonly used flow meter as a turbine flow meter can hardly be enhanced, restricted by the mechanical factors of the meter. For example, the pulse signals generated by the conventional flow meter are directly counted to learn the flow rate. For this reason the conventional fluid leakage detection apparatus as shown in FIG. 1 detects a fluid leakage but with a low precision. In order to elevate the detection precision, the gates of the gate circuits 8 and 9 may be opened for relatively long time so that the counter 10 may count more output pulses from these gate circuits 8 and 9. If the counting time for the counter 10 is made longer, however, the fluid leakage cannot be detected quickly, letting the fluid leak from the pipe line 3 in a greater amount than otherwise. Morover, a slow leakage detection may turn out to be an incorrect detection because its precision is affected more acutely than a quick detection by external factors such as the temperature, pressure and density of the fluid. What is worse, a slow leakage detection cannot locate the position of leakage accurately.

SUMMARY OF THE INVENTION

Accordingly, the object of this invention is to provide a fluid leakage detection apparatus which can detect a fluid leakage quickly with a high precision, and can thus locate the position of leakage speedily and accurately.

The apparatus according to this invention detects pulse signals generated at pulse frequencies corresponding to the flow rates of the fluid at the upstream and downstream points of a fluid passage and compares the difference between the pulse rates with a predetermined value, thereby to detect the presence or absence of a fluid leakage between the upstream and downstream points. The apparatus is characterized in that the flow rates are detected repeatedly at intervals much shorter than a difference $\Delta\tau$ between time $\tau_1$ and time $\tau_2$ which elapse until a flow rate change appears respectively at the upstream and downstream points after the fluid leakage takes place, the pattern of the flow rate variation is obtained with respect to the time $\tau_1$ and the time $\tau_2$, the time difference $\Delta\tau$ is obtained from the flowrate variation pattern, and the distance $x$ between the upstream and downstream points is obtained based on the difference $\Delta\tau$ by the following formula:

$$x = \frac{l + a \cdot \Delta\tau}{2}$$

where $l$ denotes the distance between the upstream and downstream points, and $a$ the speed of sound through the fluid.

BRIEF DESCRIPTION OF THE DRAWING

FIG. 3 shows the waveforms of signals and is to be referred to in explaining the operation of the apparatus of FIG. 2;

DETAILED DESCRIPTION OF THE INVENTION

Figure 1:
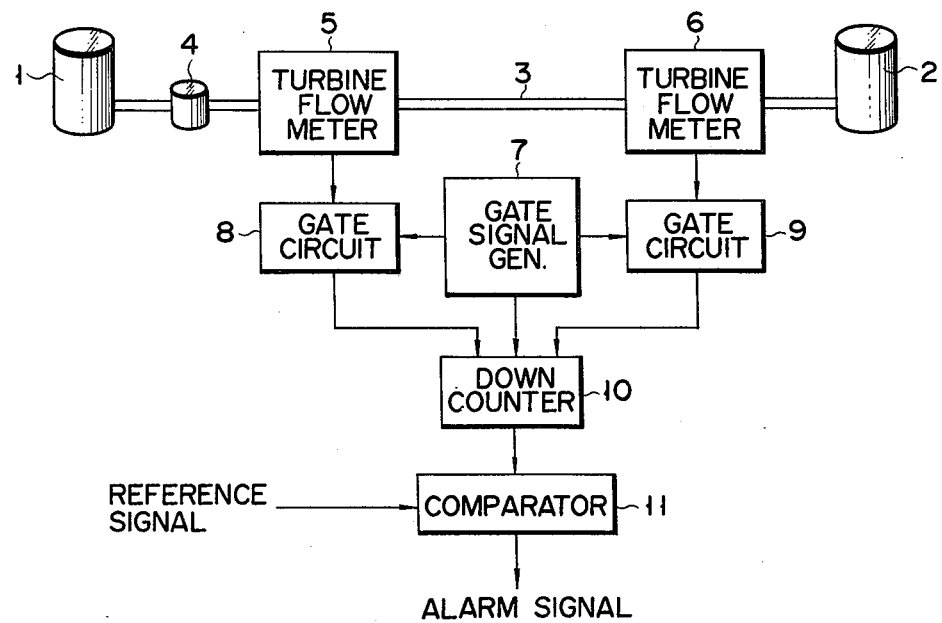
FIG. 1 is a block diagram of a conventional fluid leakage detection apparatus.
Figure 2:
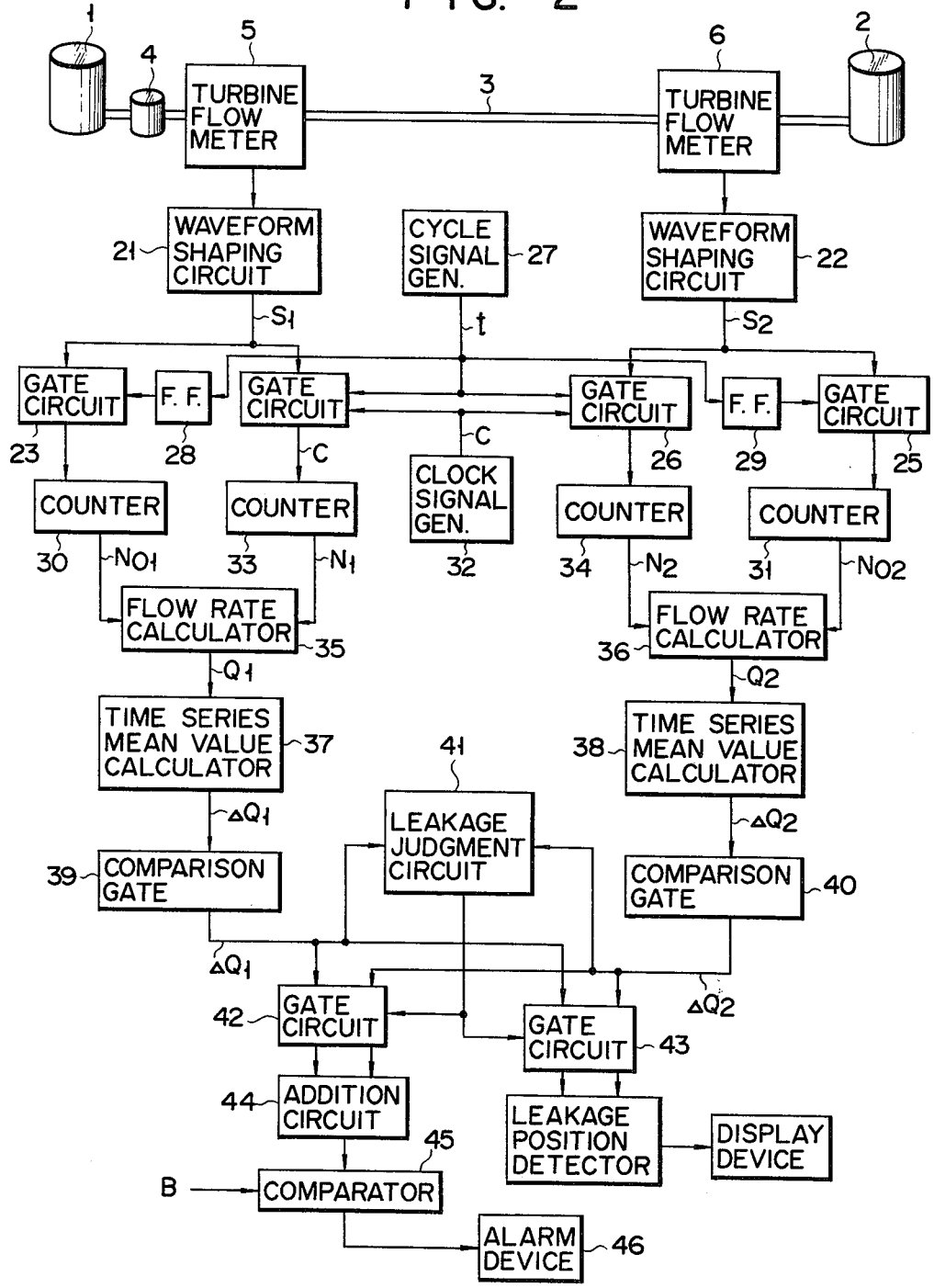
FIG. 2 is a block diagram of an embodiment of the fluid leakage detection apparatus according to this invention.

An embodiment of this invention will now be explained in detail with reference to FIG. 2 in which the elements corresponding to those in FIG. 1 bear the same reference numerals. At an upstream point of a pipe line 3 a turbine flow meter 5 is provided and generates pulse signals at a pulse rate corresponding to the flow rate of a fluid, for example, oil. The pulse signals have a broad width and a waveform with a gentle inclination at the rising section, and therefore are unsuitable for an accurate fluid leakage detection. The waveform of the pulse signals from the flow meter 5 is rectified by a waveform shaping circuit 21, thus obtaining a series of such pulses (pulse train signal) $S_1$ as shown in FIG. 3(a) with a sharp inclination at the rising section. At a downstream point of the pipe line 3 another turbine flow meter 6 is provided. The waveform of the pulse signals from the flow meter 6 is also rectified by another waveform shaping circuit 22, thereby obtaining a series of such pulses (pulse train signal) $S_2$ as shown in FIG. 3(b).

The output pulses $S_1$ of the waveform shaping circuit 21 are supplied to a primary gate circuit 23 and a secondary gate circuit 24 both provided at the upstream of the pipe line 3. At the same time, the output pulses $S_2$ of the waveform shaping circuit 22 are supplied to a primary gate circuit 25 and a secondary gate circuit 26 both provided at the downstream. Both the primary gate circuits 23 and 25 are controlled by such cycle signals $t$ as shown in FIG. 3(d) produced by a cycle signal generator 27. That is, their gates are selectively opened and closed by the cycle signals $t$, which determine the cycle time during which a fluid leakage is to be detected, if any, and which is chosen to be much shorter than a difference $\Delta\tau$ between time $\tau_1$ and time $\tau_2$ which elapse until a flow rate change appears respectively at the turbine flow meters 5 and 6 after the fluid leakage takes place at a position between the flow meters. The period of the signal $t$ is set at about 1/100 of the difference $\Delta\tau$. This period is usually set at 0.1 to 1 sec. The cycle signals $t$ are fed successively to a flip-flop 28 and a flip-flop 29 in such a manner that these flip-flop 28 and 29 are set by, for instance, a cycle signal $t_1$ and reset by a cycle signal $t_2$. When set, these flip-flops 28 and 29 supply respectively to the primary gate circuits 23 and 25 such a gate signal as shown in FIG. 3(e) with a pulse width corresponding to the time period between the generation of the cycle signals $t_1$ and $t_2$. During this time period the gates of the primary gate circuits 23 and 25 are opened, thus allowing such pulse signals as shown in FIG. 3(h) and such pulse signals as shown in FIG. 3(i) to be supplied to, and counted by, a primary counter 30 at the upstream and a primary counter 31 at the downstream, respectivey.

In the meantime, the secondary gate circuits 24 and 26 have their gates opened by the cycle signal $t$ and also respectively by the pulses $S_1$ and $S_2$, and permit clock pulses C, which have, for example, a frequency of 10 MHz and have been generated by a clock signal generator 32 and which have a higher frequency than the pulses $S_1$ or $S_2$, to be supplied respectively to a secondary counter 33 at the upstream and to a secondary counter 34 at the downstream. As shown in FIG. 3(f), the gate of the secondary gate circuit 24 is opened upon receipt of the first pulse $S_1$ after the supply of the cycle signal $t_1$ and is closed upon receipt of the first pulse $S_1$ after the supply of the cycle signal $t_2$.

Figure 5:
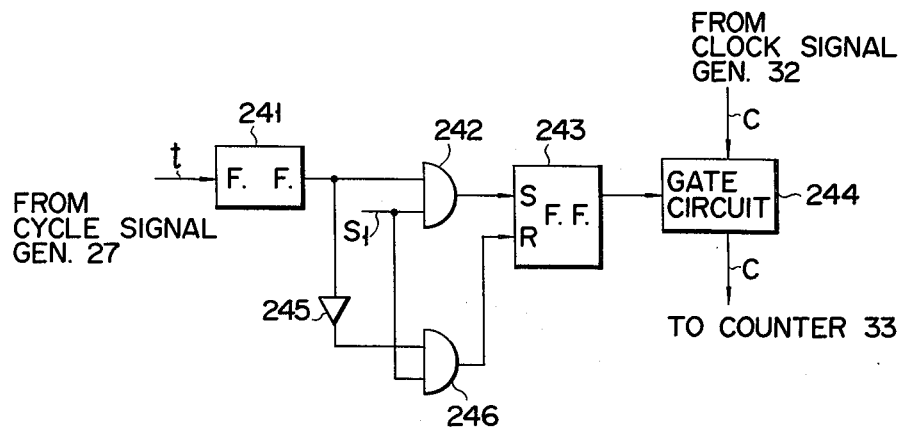
FIG. 5 is a block diagram of the secondary gate circuit at the upstream of the apparatus of FIG. 2.

The secondary gate circuit 24 is constructed, for example, as shown in FIG. 5. When a T flip-flop 241 receives the cycle signal $t_1$ from the cycle signal generator 27, it is set and produces an output, which opens one gate of an AND circuit 242. Under this condition, the AND circuit 242 gives forth an output if its other gate receives the first pulse $S_1$. The output of the AND circuit 242 is then fed to the set terminal of an SR flip-flop 243 so as to make the SR flip-flop generate a set output, which opens the gate of the gate circuit 244 as shown in FIG. 3(f), thus allowing the clock pulses C to be supplied to the counter 331.

In response to the cycle signal $t_2$ the T flip-flop 241 is reset so as to close the gate of the AND circuit 242. At the same time, one gate of another AND circuit 246 is opened by an output from an inverter 245. Under this condition, if the other gate of the AND circuit 246 receives the first pulse $S_1$, the AND circuit 246 produces an output, which resets the SR flip-flop 243, eventually closing the gate of the gate circuit 244 as shown in FIG. 3(f). Thereby such clock pulses $N_1$ as shown in FIG. 3(j) which have been generated during the opening period of the gate circuit 244 are counted by the secondary counter 33.

The secondary gate circuit 26 at the downstream is similarly constructed as shown in FIG. 5. In the secondary gate circuit 26, the time between the generation of the cycle signal $t_2$ and that of the first pulse $S_2$ is longer than the time between the generation of the cycle signal $t_2$ and the first pulse $S_1$. As a result, the secondary gate circuit 26 is opened for a longer time than the secondary gate circuit 24 at the upstream, as shown in FIG. 3(g), and such clock pulses $N_2$ as shown in FIG. 3(k) are supplied to the counter 34.

To a flow rate calculator 35 the counter 30 supplies a signal representative of the number $N_{01}$ of pulses $S_1$ counted during the cycle time between the cycle signals $t_1$ and $t_2$, and the counter 33 a signal representative of number $N_1$ of clock pulses C counted during the same cycle time. The flow rate calculator calculates the flow rate $Q_1$ at the turbine flow meter 5, using the following formula (1):

$$Q_1 = \frac{N_{01} \cdot f_0}{N_1} \cdot K_1 \cdot T \qquad (1)$$

where T denotes the cycle time, $f_0$ the frequency of the clock pulse C, and $K_1$ a constant.

Figure 6:
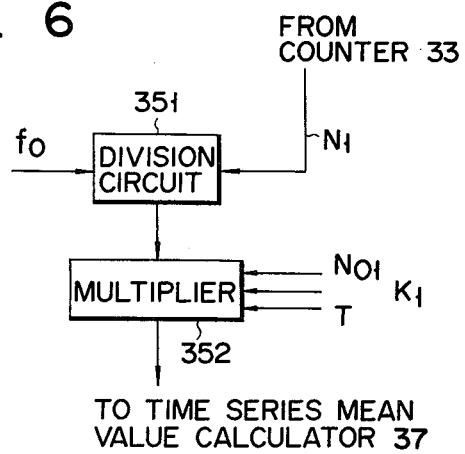
FIG. 6 is a block diagram of the flow rate calculator at the upstream of the apparatus of FIG. 2.

The flow rate calculator 35 is constructed, for example, as shown in FIG. 6. The signal representative of $N_1$ is fed to a division circuit 351 together with a signal representative of $f_0$. The division circuit 351 divides $f_0$ by $N_1$ to obtain the mean cycle of the clock pulses C (i.e. $f_0/N_1$). The mean cycle is transferred to a multiplier 352 and multiplied by $N_{01}$, $K_1$ and T, thereby to complete the calculation based on the formula (1). The flow rate $Q_1$ at the flow meter 5 is thus obtained by the flow calculator 35 and then fed to a time series mean value calculator 37. Meanwhile, the flow rate $Q_2$ at the turbine flow meter 6 is obtained by a flow rate calculator 36 similar to the flow rate calculator 35 and then fed to another time series mean value calculator 38.

Figure 7:
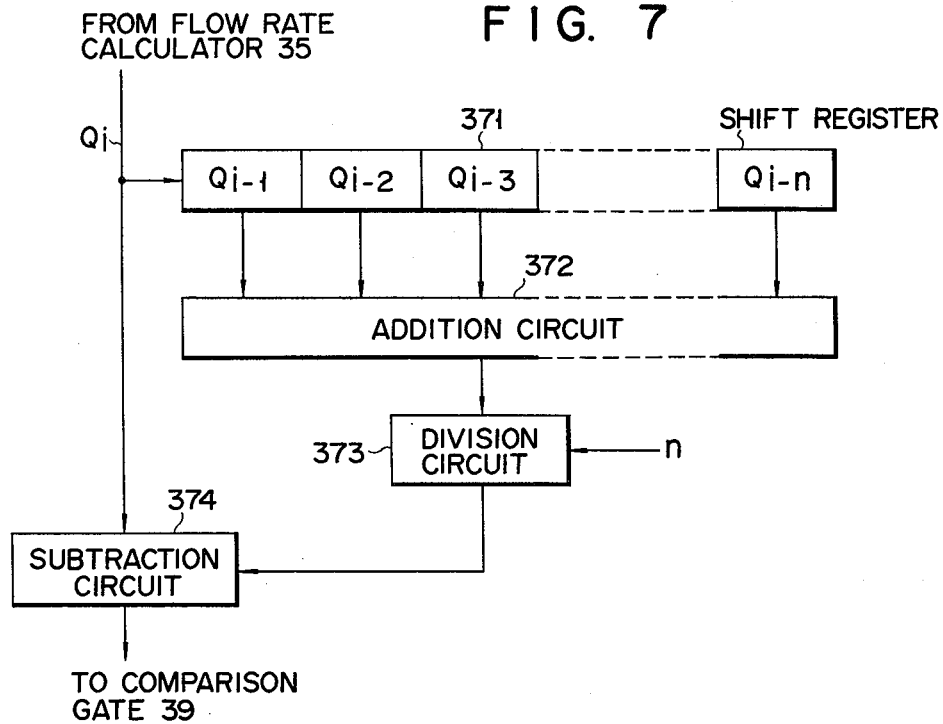
FIG. 7 is a block diagram of the time series mean value calculator at the upstream of the apparatus shown in FIG. 2.

The time series mean value calculator 37 is to obtain the difference $Q_1$ between the n-th flow rate $Q_1$ obtained by the flow rate calculator 35 and the mean value $$\frac{\sum_{i=1}^{n} Q_{1i}}{n}$$

of past $n$ flow rates $Q_{i-1}$, $Q_{i-2}$, $Q_{i-3}$, .... $Q_{i-n}$ obtained in n-number of cycle times. It is constructed, for example, as shown in FIG. 7. The number of $n$ is preferably set at twice the period of variation of Q. From the flow rate calculator 35 a shift receives and stores sequentially the flow rate signals representative of $Q_{i-n}$, $Q_{i-(n-1)}$, .... $Q_{i-3}$, $Q_{i-2}$ and $Q_{i-1}$. The flow rates $Q_{i-n}$ to $Q_{i-1}$ are all transferred to an addition circuit 372 so as to obtain the sum of them.

$$\sum_{i=1}^{n} Q_{1i} .$$

A signal representative of the sum is then fed to a division circuit 373 and divided by $n$. Thus, the mean value of n-number of flow rates is obtained. The mean value is fed to a subtraction circuit 374, which obtains a flow rate increment $\Delta Q_1$, the difference between the mean flow rate and the flow rate $Q_i$ obtained immediately after the flow rate $Q_{i-1}$. Namely, $$\Delta Q_1 = Q_i - \frac{\sum_{i=1}^{n} Q_{1i}}{n}$$

The series mean value calculator 38 at the downstream is constructed in the same manner as the calculator 37 at the upstream and gives forth an output, i.e. a flow rate increment or decrement $\Delta Q_2$.

Figure 8:
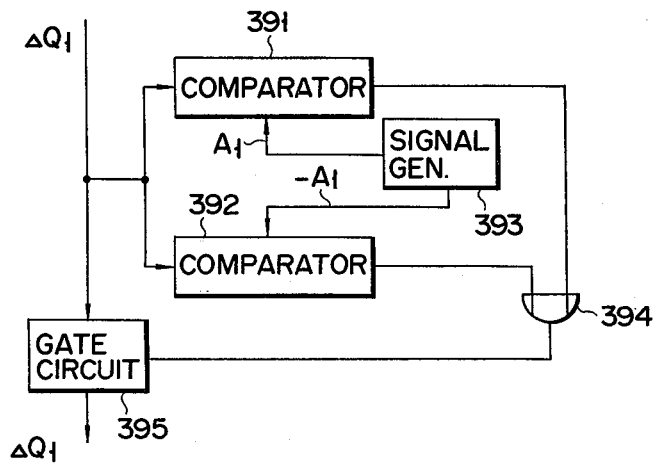
FIG. 8 is a block diagram of the comparison gate at the upstream of the apparatus of FIG. 2.

The flow rate increments or decrements $\Delta Q_1$ and $\Delta Q_2$ thus obtained respectively at the upstream and the downstream points are supplied to comparison gates 39 and 40, respectively. The comparison gate 39 compares $|\Delta Q_1|$ with a flow rate variation allowance $|A_1|$ which has been predetermined. Only if $|\Delta Q_1| > |A_1|$, that is, $\Delta Q_1 > A_1$ or $\Delta Q_1 < -A_1$, the comparison gate 39 passes its input signal representative of $\Delta Q_1$. It is constructed, for example, as shown in FIG. 8. One input terminal of a comparator 391 receives the output signal of the time series means value calculator 37, i.e. the flow rate increment $\Delta Q_1$. The other input terminal of the comparator 391 receives the flow rate variation allowance $A_1$. Only when $\Delta Q_1 > A_1$, the comparator 391 produces an output, which is supplied to the gate terminal of a gate circuit 395 through an OR gate 394. Upon receipt of the output of the comparator 391, the gate circuit 395 has its gate opened, thereby passing the signal representative of $\Delta Q_1$. Similarly, the flow rate increment $\Delta Q_1$ is supplied to one input terminal of another comparator 392. To the other input terminal of the comparator 392 a negative flow rate variation allowance $-A_1$ is supplied from a signal generator 393. Only when $\Delta Q_1 < -A_1$, the comparator 392 produces an output, which is supplied also to the gate terminal of the gate circuit 395 through the OR gate 394. This also allows the signal representative of $\Delta Q_1$ to pass through the gate circuit 395. Consequently, only when $|\Delta Q_1| > |A_1|$, the gate of the comparison gate 39 opens to let the signal representative of $\Delta Q_1$ pass therethrough. That is, so long as the relation $A_1 < \Delta Q_1 < -A_1$ remains, any flow rate variation is proved to be caused not by an oil leakage.

Also at the downstream of the pipe line 3 a comparison gate 40 is provided. The gate may have a similar construction to that of the comparison gate 39 at the upstream. The flow rate variation allowance present in this gate 40 may range from $-A_1$ to $A_1$ as in the gate 39 or may be quite differently from $-A_2$ to $A_2$.

Both flow rate increments $\Delta Q_1$ and $\Delta Q_2$ are transferred from the comparison gates 39 and 40 to a leakage judgement circuit 41. Simultaneously they are supplied to the input terminals of gate circuits 42 and 43, respectively. The leakage judgement circuit 41 compares the flow rate increments $\Delta Q_1$ and $\Delta Q_2$ and judges that a fluid leakage has occurred, if $\Delta Q_1$ is positive and $\Delta Q_2$ is negative (i.e. $-Q_2$) or vice versa.

Figure 4:
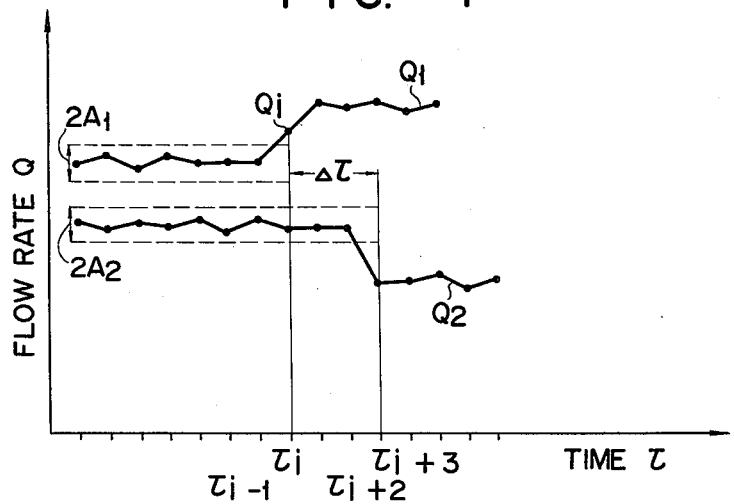
FIG. 4 is a graph showing the variation of flow rates at the upstream and downstream points in the apparatus illustrated in FIG. 2 along with time elapse.

With reference to FIG. 4, there will be explained why an oil leakage can be judged to have occurred between the turbine flow meters 5 and 6. In the graph of FIG. 4, the output signals of the flow rate calculator 35 (i.e. flow rates $Q_1$) and those of the flow rate calculator 36 (i.e. flow rates $Q_2$) are plotted to the respective cycle times during which the signals have been generated. The graph shows the case where oil leaks at a position nearer to the flow meter 5 than to the flow meter 6. Some time $\tau_1$ after the oil leakage, the flow rate $Q_1$ at the upstream point increases. With a time lag of $\Delta\tau$, the flow rate $Q_2$ and the downstream point decreases some time $\tau_2$ after the oil leakage. That is, should an oil leakage take place, the flow rates at the upstream and downstream points would respectively increase and decrease in proportion to the amount of the leaked oil. The total amounts of this increase and decrease correspond to the oil leaked. Accordingly, the flow rate increment $\Delta Q_1$ has a positive value, and the flow rate increment $\Delta Q_2$ a negative value. In other words, if $\Delta Q_1$ and $\Delta Q_2$ are found to have a positive value and a negative value, respectively, an oil leakage is detected to have occurred at a position nearer to the flow meter 5.

Figure 9:
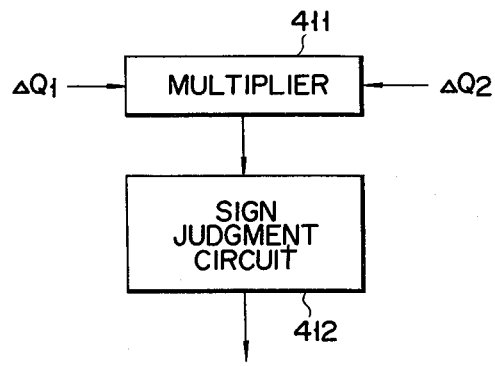
FIG. 9 is a block diagram of the leakage judgement circuit of the apparatus of FIG. 2.

Consequently, if such a multiplier 411 as shown in FIG. 9 is employed to obtain the product of the two increments $\Delta Q_1$ and $\Delta Q_2$ and such a sign judgement circuit 412 as shown in FIG. 9 is used to learn the sign of the product, the presence or the absence of an oil leakage can be detected. If the product is judged to be negative, the sign judgement circuit 412 produces an output, which is fed to the gate input terminal of a gate circuit 42 and to that of another gate circuit 43.

The gate circuits 42 and 43 have their gates opened only when they receive the output of the sign judgement circuit 412, thereby passing both signals representative of $\Delta Q_1$ and $\Delta Q_2$. The signals representative of $\Delta Q_1$ and $\Delta Q_2$ from the gate circuit 42 are supplied to an addition circuit 44. The addition circuit 44 obtains the sum of $|\Delta Q_1| + |\Delta Q_2|$ which corresponds to the amounts of the total leaked oil. The sum of these absolute values, if found to be greater than a predetermined alarm set value B, tells occurrence of leakage between the upstream and the downstream points. Thus, the output of the addition circuit 44 is fed to a comparator 45 and compared with the predetermined alarm set value B. If the output of the addition circuit 44 is greater than B, the comparator 45 generates an output, which causes an alarm device 46 to give off an alarm signal indicating leakage between the upstream and the downstream.

The output of the leakage judgement circuit 41 is fed to the gate circuit 43 and opens the gate thereof. As a result, the signals representative of the flow rate increments $\Delta Q_1$ and $\Delta Q_2$ are transferred through the gate circuit 43 to a leakage position detector 47. The leakage position detector 47 is so designed as to measure a difference $\Delta \tau$ between the time $\tau_1$ and the time $\tau_2$ which elapse until a flow rate change is detected respectively by the flow meters 5 and 6 after the oil leakage takes place. It calculates based on the obtained $\Delta \tau$ the distance $x$ between the turbine flow meter 5 and the position of oil leakage, using the following formula (2):

$$x = \frac{l + a \cdot \Delta \tau}{2} \qquad (2)$$

where $l$ denotes the distance between the turbine flow meters 5 and 6, and $a$ the speed of sound through the oil. If $a = 1200$ m/sec., $l = 50$ km and $\Delta \tau = 5$, then it is obtained as $x = 28$ km or $x = 22$ km from the flow meter 5.

Here it will be explained why the speed $a$ of sound through the oil is utilized to locate the position of oil leakage. When the oil leaks, its pressure varies at the position of leakage. This pressure variation propagates both to the upstream and the downstream points of the pipe line 3 in the form of a pressure wave. The speed of the pressure wave is known to be equal to that of sound through the oil flowing in the pipe line 3. If the flow meters 5 and 6 detect the flow rates repeatedly at intervals much shorter than the above-noted time difference $\Delta \tau$, the pattern of the flow rate variation is thereby detected with respect to the time $\tau_1$ and the time $\tau_2$. From the pattern, the time difference $\Delta \tau$ is obtained. Thus, the distance $x$ between the turbine flow meters 5 and 6 and the leakage position can be obtained by the formula (2).

Figure 10:
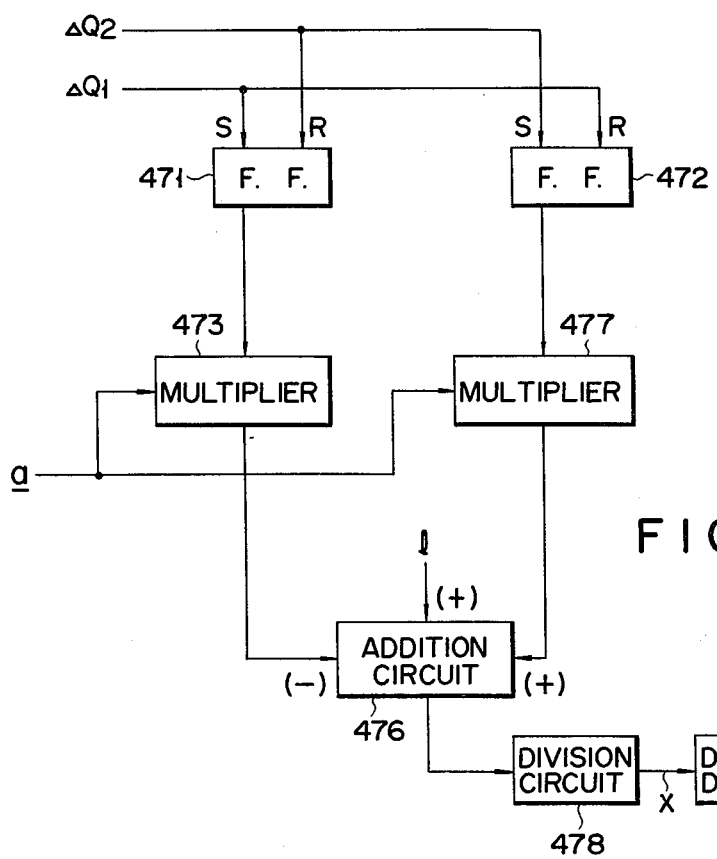
FIG. 10 is a block diagram of the leakage position detector of the apparatus of FIG. 2.

Now the circuit structure of the leakage position detector 47 will be explained in detail with reference to FIG. 10. The signal representative of the flow rate increment or decrement $\Delta Q_1$ is supplied from the gate circuit 43 to the set terminal of an SR flip-flop 471 and to the reset terminal of another SR flip-flop 472. Suppose the oil happens to leak from the pipe line 3 at a position nearer to the turbine flow meter 5 than to the turbine flow meter 6. Then, the change of flow rate $Q_1$ is detected by the flow meter 5 before the change of flow rate $Q_2$ is detected by the flow meter 6. As a result, the signal representative of the flow rate increment $\Delta Q_1$ is supplied to the leakage position detector 47 before the signal representative of the flow rate increment $\Delta Q_2$, thus setting the SR flip-flop 471 and resetting the SR flip-flop 472. When set, the SR flip-flop 471 produces an output, which is supplied to a multiplier 473.

Under this condition, when the flow rate $Q_2$ at the downstream decreases upon the elapse of $\Delta \tau$ as shown in FIG. 4, the flow rate difference (i.e. $|\Delta Q_2|$) between the flow rate $Q_2$ and the time series mean value increases proportionally. Then, the SR flip-flop 471 is reset, and the SR flip-flop 472 is set. Namely, the SR flip-flop 471 is set for a time corresponding to the time difference $\Delta \tau$, and its set output is added to the multiplier 473. The set output of the SR flip-flop 471 is a signal representing the time difference $\Delta \tau$. This set output (i.e. $\Delta \tau$) is multiplied by a signal representative of the sound speed through the oil. The product (i.e. $a \cdot \Delta \tau$), the output of the multiplier 473, is fed to the negative terminal of an addition circuit 476. By now a positive terminal of this addition circuit 476 is fed with a signal representative of the distance between the turbine flow meters 5 and 6. The addition circuit 476 therefore carries out subtraction: $l - a \cdot \Delta \tau$. The output of the addition circuit 476 is then supplied to a division circuit 478 and divided by 2. The division circuit 478 emits an output (i.e. $l - a \cdot \Delta \tau / 2$), the distance $x$ between the turbine flow meter 5 and the position of oil leakage. The output of the division circuit 478 is supplied to a display device 48, which displays the distance $x$ visually. Thus it is ascertained that the oil has leaked at a position at the distance of $a \cdot \Delta \tau / 2$ from the middle point toward the turbine flow meter 5.

If the oil leakage has occurred at a position nearer to the downstream, the SR flip-flop 472 is first set by the signal (i.e. $\Delta Q_2$) and then reset by the signal (i.e. $\Delta Q_1$) after a time corresponding to the time difference $\Delta \tau$. The set output (i.e. $\Delta \tau$) of the SR flip-flop 472 is multiplied by the sound speed in a multiplier 477. The product (i.e. $a \cdot \Delta \tau$) is supplied to the other positive terminal of the addition circuit 476. Then, the addition circuit 476 effects an arithmetical operation: $l + a \cdot \Delta \tau / 2$. The results of the operation, the distance $x$ between the turbine flow meter 5 and the position of oil leakage are supplied to the display device 48, and displayed consequently.

The sound speed $a$ through the oil varies a little in accordance with the temperature, viscosity, pressure or density of the oil. If this variation in the sound speed is corrected, the position of oil leakage can be detected much more accurately.

In the foregoing explanation, the application of this invention is limited to an oil pipe line. This invention can of course be applied to a pipe line for transportation of any other fluids, liquids or gases.

In the embodiment of this invention, the oil leakage is announced as an alarm device gives off an alarm signal. The warning of the oil leakage need not be limited to this method. A display device may be employed to display the oil leakage visually. Or the alarm signal may be used as a line shut-out signal, upon receipt of which the pump 4 ceases to pump out the oil.

As mentioned above, according to this invention the flow rate of the fluid can be detected at two points of the pipe line repeatedly at very short intervals. This makes it possible to obtain an accurate pattern of the flow rate variation with respect to elapse of time. From this pattern there can easily be detected an accurate time difference $\Delta\tau$ between the time $\tau_1$ elapsed until the flow rate change is detected at one point after the fluid leakage and the time $\tau_2$ elapsed until the flow rate change is detected at the other point after the fluid leakage. Thus, based on the time difference $\Delta\tau$ the fluid leakage is ascertained, and the position of the leakage is located quickly with a high precision.

What we claim is:

1. An apparatus for detecting a flow rate between the upstream and downstream points of a fluid passage having means for detecting pulse signals generated at pulse rates corresponding to the respective flow rates of the fluid at said upstream and downstream points, characterized in that said apparatus comprises:

a flow meter means at each of said upstream and downstream points for generating flow rate pulse signals at pulse rates corresponding to the respective flow rates to be detected, a first gate circuit for passing the flow rate pulse signals for a predetermined cycle time, a first counter for counting the flow rate pulse signals from said first gate circuit, a clock pulse generator for generating clock pulses at a pulse rate higher than the pulse rate of the flow rate pulse signals, a second gate circuit for passing the clock pulses generated by said clock pulse generator in said cycle time, a second counter for counting the clock pulses from the second gate circuit, and arithmetic operation means for calculating the flow rate of the fluid at every cycle time based on the count values of said first and second counters, the pulse rate of the clock pulses, and the length of said cycle time.

2. An apparatus for detecting fluid leakage between the upstream and downstream points of a fluid passage having means for detecting pulse signals generated at pulse rates corresponding to the respective flow rates of the fluid at said upstream and downstream points and means for comparing the difference between the two pulse rates with a predetermined value, characterized in that said apparatus comprises:

means for repeatedly detecting the flow rates at said upstream and downstream points at intervals much shorter than a difference $\Delta\tau$ between time $\tau_1$ and time $\tau_2$ which elapse until a flow rate change occurs respectively at said upstream point and said downstream point after a fluid leakage takes place between said upstream and downstream points, means for obtaining the pattern of the flow rate change with respect to the time $\tau_1$ and the time $\tau_2$, means for obtaining the time difference $\Delta\tau$ from the flow rate change pattern, and a time series mean value calculator means for obtaining the flow rate variance at said upstream and downstream points, said calculator means comprising a shift register for storing sequentially the flow rates at respective cycle times, an addition circuit for obtaining the sum of the flow rates stored in said shift register, a division circuit for obtaining the time series means value of the flow rate with respect to each cycle time on the basis of the sum of the flow rates, and a subtraction circuit for obtaining the difference between the time series mean value of the flow rate and the flow rate with respect to the cycle time immediately following the last cycle time, the outputs of the subtraction circuit representing said flow rate variances, and means coupled to said calculator means for detecting the fluid leakage by comparing a predetermined alarm set value and the sum of the flow rate variances at said upstream and downstream points.

3. An apparatus for detecting a fluid leakage between the upstream and downstream points of a fluid passage having means for detecting pulse signals generated at pulse rates corresponding to the respective flow rates of the fluid at said upstream and downstream points and means for comparing the difference between the two pulse rates with a predetermined value, characterized in that said apparatus comprises:

means for repeatedly detecting the flow rates at said upstream and downstream points at intervals much shorter than a difference $\Delta\tau$ between time $\tau_1$ and time $\tau_2$ which elapse until a flow rate change occurs respectively at said upstream point and said downstream point after a fluid leakage takes place between said upstream and downstream points, means for obtaining the pattern of the flow rate change with respect to the time $\tau_1$ and the time $\tau_2$, means for obtaining the time difference $\Delta\tau$ from the flow rate change pattern, and means responsive to said obtained time difference $\Delta\tau$ for obtaining the distance $x$ between the fluid leakage position and one of said upstream and downstream points as a function of the following formula:

$$x = \frac{l + a \cdot \Delta\tau}{2}$$

where $l$ denotes the distance between said points, and $a$ the speed of sound through the fluid, whereby the fluid leakage position is located.

4. Apparatus according to claim 3 wherein said means for repeatedly detecting the flow rate comprises:

flow meters at said upstream and downstream points for generating flow rate pulse signals at pulse rates corresponding to the flow rates to be detected, a first gate circuit for passing the flow rate pulse signals for a predetermined cycle time, a first counter for counting the flow rate pulse signals from said first gate circuit, a clock pulse generator for generating clock pulses at a pulse rate higher than the pulse rates of the flow rate pulse signals, a second gate circuit for passing the clock pulses generated by said clock pulse generator in said cycle time, a second counter for counting the clock pulses from the second gate circuit, and arithmmetic operation means for calculating the flow rate of the fluid at every cycle time based on the count values of said first and second counters, the pulse rate of the clock pulses, and the length of said cycle time.

5. Apparatus according to claim 3 wherein said means for obtaining the flow rate change pattern includes a time series means value calculator which comprises a shift register for storing sequentially the flow rates at respective cycle times, an addition circuit for obtaining the sum of the flow rates stored in said shift register, a division circuit for obtaining the time series mean value of flow rate with respect to each cycle time on the basis of the sum of the flow rates, and a subtraction circuit for obtaining the difference between the time series mean value of flow rate and the flow rate with respect to the cycle time immediately following the last cycle time, whereby the pattern of the flow rate change is represented by the output of the time series mean value calculator which is a signal representing the flow rate change.

6. Apparatus according to claim 3 wherein said means for obtaining said time difference $\Delta\tau$ comprises means for forming a first signal corresponding to a flow rate change first at one of said points, a flip-flop which is set in response to said first occurred signal and means for generating a second signal in response to a flow rate change next occurred at the other point and for resetting said flip-flop in response to said second signal.

* * * * *